United States Patent [19]

Norton

[11] 4,385,396
[45] May 24, 1983

[54] NRZ DIGITAL DATA RECOVERY

[75] Inventor: Jerry J. Norton, Bartlesville, Okla.

[73] Assignee: Phillips Petroleum Company, Bartlesville, Okla.

[21] Appl. No.: 270,696

[22] Filed: Jun. 5, 1981

[51] Int. Cl.³ .............................................. H04L 7/08
[52] U.S. Cl. ................................... 375/110; 375/120; 360/51; 307/269
[58] Field of Search ................... 375/80, 81, 110, 119, 375/120; 360/40, 41, 44, 51; 328/163, 155; 307/269, 480

[56] References Cited

U.S. PATENT DOCUMENTS

| | | |
|---|---|---|
| 3,389,337 | 6/1968 | Hubbard et al. .......................... 375/4 |
| 3,778,550 | 12/1973 | David et al. .......................... 375/119 |
| 3,865,981 | 2/1975 | Welch et al. ............................ 360/51 |
| 3,992,581 | 11/1976 | Davis ................................... 375/120 |
| 4,029,905 | 6/1977 | Abraham ................................ 375/110 |
| 4,078,157 | 3/1978 | Lender et al. ......................... 328/164 |
| 4,280,099 | 7/1981 | Rattlingourd ......................... 307/269 |

Primary Examiner—Benedict V. Safourek
Assistant Examiner—Stephen Chin

[57] ABSTRACT

A clock signal required for demodulation of a received NRZ digital data stream is generated by comparing transition data for the received NRZ digital data stream to a clock signal which has a period equal to the bit period of the NRZ digital data stream. The results of the comparison is utilized to shift the clock signal in such a manner that the clock signal will be synchronized with the received NRZ digital data stream so as to provide a clock signal which may be utilized to demodulate the received NRZ digital data.

6 Claims, 3 Drawing Figures

NRZ DIGITAL DATA RECOVERY

This invention relates to demodulating non-return to zero (NRZ) digital data. In one aspect this invention relates to method and apparatus for generating a clock signal which may be used to demodulate NRZ digital data.

As used herein, the term "NRZ digital data" refers to a code form having two states, termed zero and one, and no neutral or rest condition. The waveform may cross a neutral axis but the information is contained in the state of the waveform. Many different communication systems utilize an NRZ digital data code form.

As transmitted, NRZ digital data will remain in one of two states for a set period of time which will be referred to hereinafter as the "bit" period. At the end of the bit period, the waveform may shift to the second state or remain in the first state. NRZ digital data may be demodulated by integrating the received signal for the bit period. The integration is generally under the control of an integrator clock signal which has a period (referred to hereinafter as the "integrator clock period") the same as the bit period. If the integrator-clock is not synchronized with the received NRZ data, the integration may begin at the wrong time and an excessive error rate will result. It is thus an object of this invention to provide method and apparatus for generating an integrator-clock signal which is synchronized with the received NRZ data and thus may be utilized to demodulate NRZ digital data.

In accordance with the present invention, method and apparatus is provided for generating an integrator clock signal which has a period equal to the bit period at which an NRZ digital data stream was transmitted and which is synchronized with the received NRZ digital data stream. The integrator-clock signal is utilized to clock an integrator which is utilized to demodulate the received NRZ digital data stream. Errors are substantially reduced because the integration will be begun at the correct time.

In general, the required integrator clock signal may be generated by detecting each transition across a reference axis made by the received NRZ digital data stream. This transition data is then compared to a periodic signal which has the same period as the bit period to determine if the transition data and the periodic signal are synchronized. If the transition signal and the periodic signal are not synchronized, the timing of the periodic signal is changed by adding pulses to or subtracting pulses from the signal utilized to drive the periodic signal generator. This action adjusts the timing of the periodic signal until the periodic signal is synchronized with the transition data so as to provide the integrator clock signal which is utilized to clock the integrator.

Other objects and advantages of the invention will be apparent from the foregoing brief description of the invention and the claims as well as the detailed description of the drawings in which:

The invention is described in terms of particular circuitry for demodulating NRZ digital data and is also described in terms of particular circuitry for shifting the integrator clock signal utilized to clock an integrator. The invention is, however, applicable to different circuits which accomplish the functions required by the present invention. The invention is also applicable to different detection systems if such demodulation systems require the use of a synchronized clock signal to recover information in a received waveform.

Figure 1:
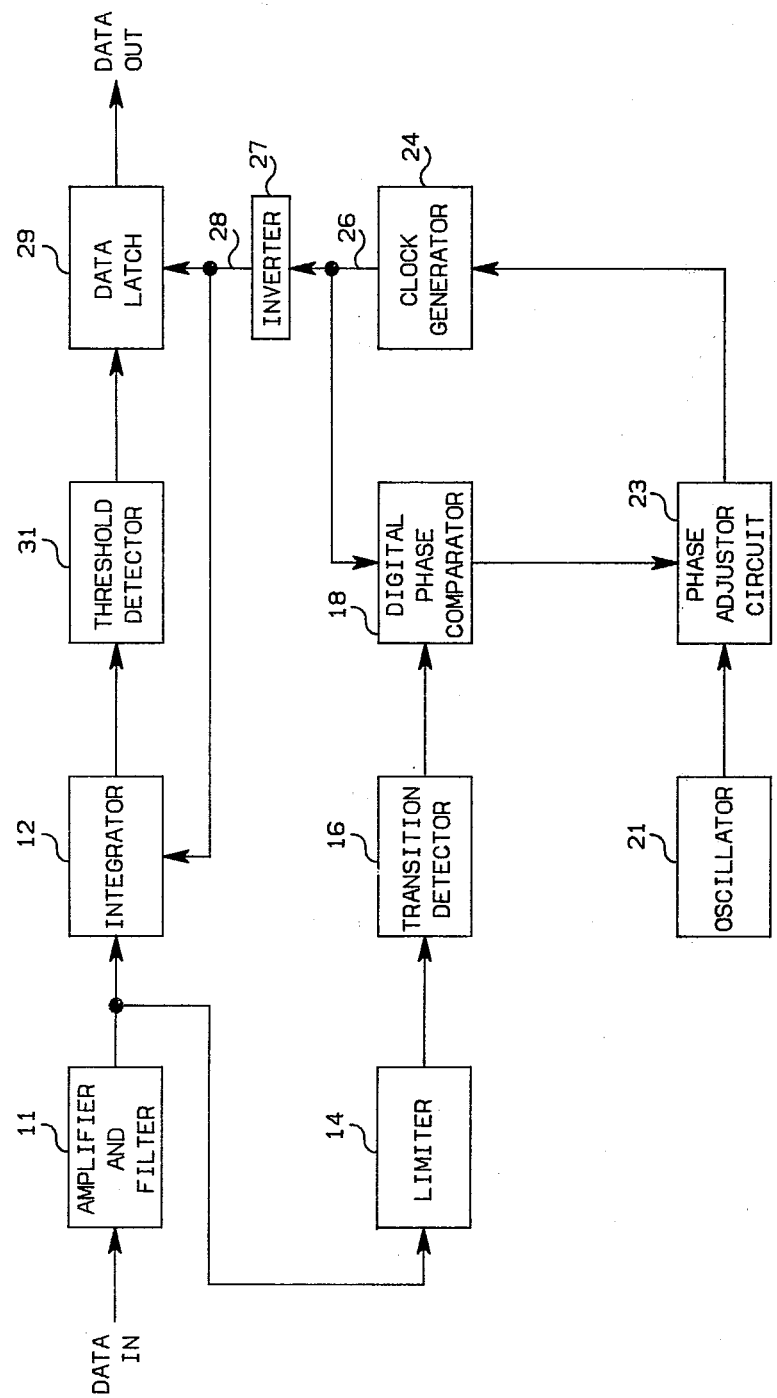
FIG. 1 is a diagrammatic illustration of the circuitry utilized to recover distorted NRZ digital data in accordance with the present invention.

Referring now to the drawings and in particular to FIG. 1, received NRZ digital data is provided to the amplifier and filter 11. The amplifier and filter is utilized to precondition the signal to the correct level or amplitude for optimum circuit operation. Also, if the received signal contains out of band frequency components that could cause improper circuit operation, these out of band signal components are filtered. The use of the amplifier and filter 11 is not required but is desirable to minimize the error rate.

The output signal from the amplifier and filter 11 is provided to both the integrator 12 and the limiter 14. If it is assumed that the data transmitted was one zero one zero one zero, then the received data supplied to the limiter 14 and the integrator 12 might have the waveform illustrated in FIG. 2. The limiter 14 is utilized to make a general decision as to whether the received signal is a "one" to a "zero". The limiter 14 will output a signal having the form of a "squared up" received data signal. The output from the limiter is provided to the transition detector 16.

Figure 2:
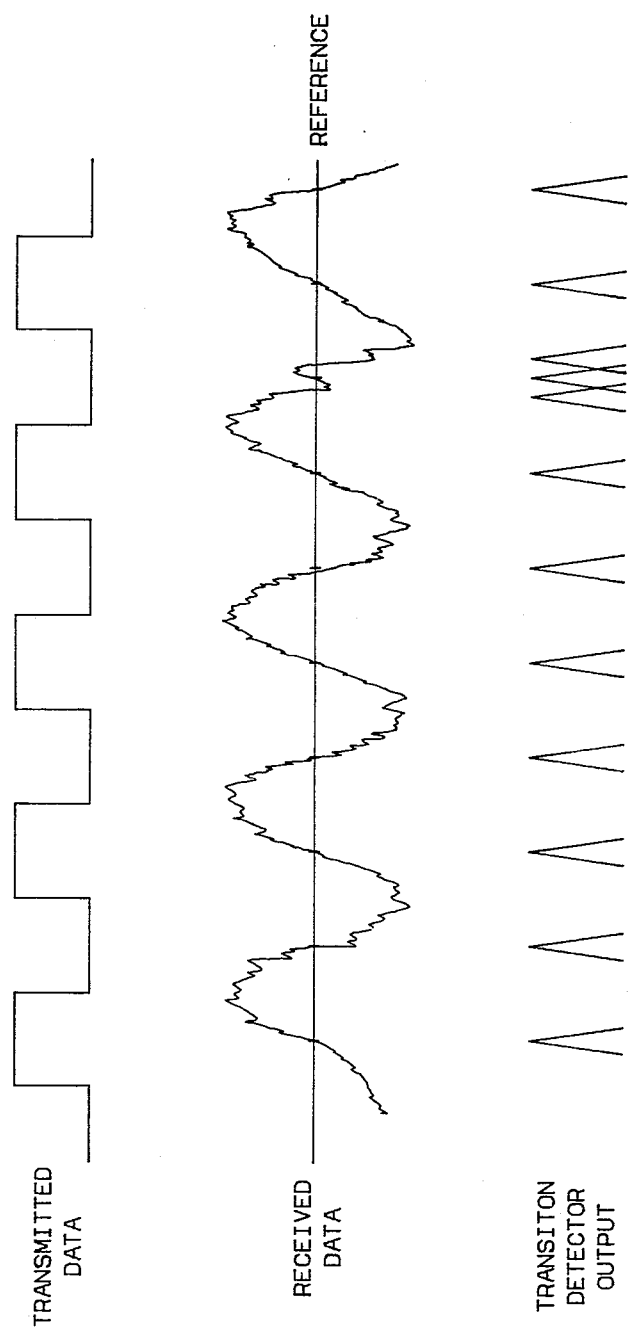
FIG. 2 is an illustration of the waveform of the transmitted data, received data and transition detector output.

The transition detector 16 outputs a pulse each time the limiter output makes a transition from a reference level. If the reference level were as illustrated in FIG. 2, the output from the transition detector would be as illustrated in FIG. 2 for the assumed received waveform. Essentially, the output of the transition detector will be periodic if the received waveform makes a transition each bit period. The period is the same as the clock period for the transmitted data. If the received waveform does not make a transition each bit period (as would be typical), then the output of the transition detector 16 will not be periodic but each output spike will occur at substantially some multiple of the bit period. It is noted that because of noise, additional pulses may be provided from the transition detector but in general the pulses occur at some multiple of the bit period. If the pulses do not occur at substantially some multiple of the bit period, it is generally not possible to recover the transmitted data without a significant number of errors occurring.

The pulse outputs from the transition detector 16 are provided as an input to the digital phase comparator 18. It is noted that use of the limiter 14 is not required so long as the transition circuit used can provide the transition data required by the digital phase comparator 18.

The oscillator 21 is utilized to generate a periodic signal which is utilized to drive the clock generator 24. The periodic signal is provided from the oscillator 21 through the phase adjustor circuit 23 to the clock generator 24. The clock generator 24 will provide an output periodic signal having a period equal to the bit period of the transmitted data. The period of the output clock signal from the clock generator 24 will be determined by the frequency of the oscillator 21. Essentially, the clock generator 24 divides the frequency of the oscillator 21 by some factor to provide the clock signal. Thus, assuming the clock generator 24 is a divide by 100, the frequency of the oscillator 21 is chosen to be 100 times as great as the bit period of the transmitted signal (the bit period of the transmitted signal will be known). The thus generated clock signal 26 is provided from the clock generator 24 as a second input to the digital phase comparator 18 and as an input to the inverter 27.

The digital phase comparator 18 compares the output from the transition detector 16 to the clock signal 26 to determine if the pulses provided from the transition detector 16 are ahead of or behind where the pulses should be when compared to the clock signal 26. The output from the digital phase comparator 18 causes the pulse adjustor circuit 23 to add or remove pulses from the output of the oscillator 21 which drives the clock generator 24. This action adjusts the timing of the clock signal 26 to synchronize the clock signal 26 with the pulses provided from the transition detector 16. In this manner, a clock signal 26 is generated which is synchronized with the received data. The thus generated clock signal 26 may be utilized to clock the integrator 12 so as to insure that the integration is performed over the correct period of time.

At the end of the clock period for the clock signal 26, the inverter 27 provides an output signal 28 to both the integrator 12 and the data latch 29. The use of signal 28, which will be in the form of a pulse, will be described more fully hereinafter.

The integrator 12 is utilized to integrate the received data signal over a particular period of time which is determined by the period of the clock signal 26. The operation of such an integrator is well known in the art of communication systems. Essentially, if the received data signal for a bit period is considered a curve, the integrator determines the area under the curve with respect to a particular reference, such as the reference level illustrated in FIG. 2.

The output of the integrator is provided to the threshold detector 31. The threshold detector 31 is utilized to determine whether the output level of the integrator 12 is high enough to be a "one" or low enough to be a "zero". The decision of the threshold detector 31 is provided to the data latch 29 to be stored by a latch command. The thus stored data may be output as required. The present invention is particularly applicable to use in repeater stations and thus the output from the data latch 29 could be provided to a transmitter for transmission to another repeater station or a final destination as desired.

Immediately after the latch command causes the output of the threshold detector 31 to be stored in the data latch 29, a dump command causes the integrator capacitor to discharge thus allowing the integrator to start from zero on the next bit of information.

The latch command is the leading edge of pulse 28. In general, data will be latched when the pulse 28 level has reached between 30 percent and 70 percent of its maximum value. The integrator 12 is reset simultaneously with data latch.

In summary, the received data may be severely distorted by noise but will in general have a transition periodicity (the bit period or multiples of the bit period) which can be detected by the transition detector 16. This periodicity provides an indication of the initial bit period used to transmit the data. By adjusting the clock signal utilized to clock the integrator 12 in such a manner that the clock signal is synchronous with the output of the transition detector 16, a correct period of integration is provided and the error rate is significantly reduced as compared to detection systems in which shifting of the integrator clock signal is not available.

Figure 3:
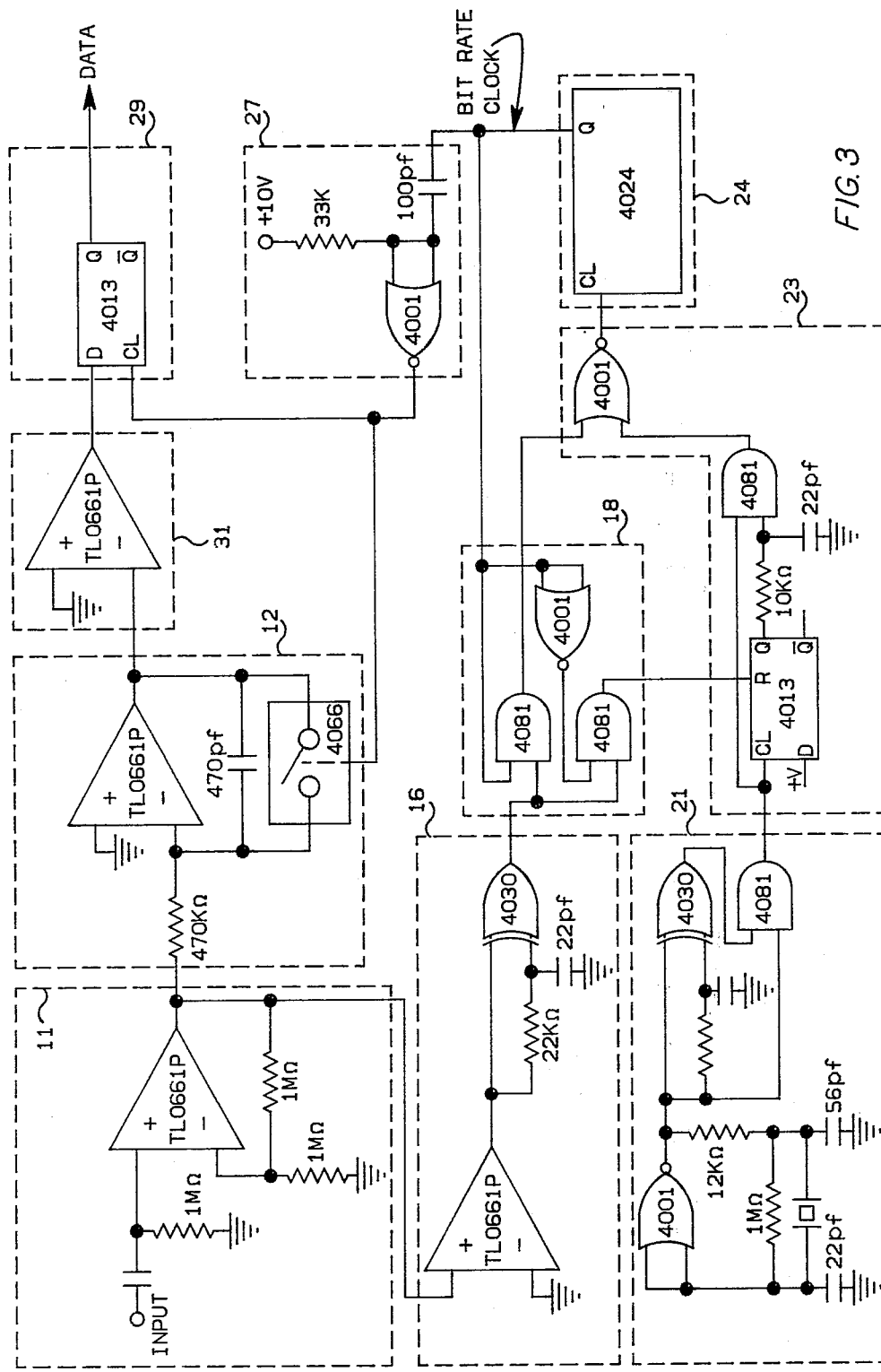
FIG. 3 is a schematic diagram of electrical circuitry which may be utilized to perform the functions illustrated in FIG. 1.

A circuit which may be utilized to implement the functions illustrated in FIG. 1 is illustrated in FIG. 3. The circuit is preferably implemented utilizing 4000 Series CMOS chips. These chips may be obtained from a number of manufacturers such as RCA, Motorola, Fairchild, and National. Also, the operational amplifiers may be obtained from a number of manufacturers. The function of each of the chips is fully described by literature supplied by the manufacturers of these chips and the manner in which the circuit operates would be obvious to one skilled in the art of electronics.

Power supplies and other conventional circuitry required by the various chips have not been illustrated in FIG. 3 for the sake of simplicity. Again, such power supplies and additional circuitry required are specified by the manufacturers and are well known to those skilled in the art of electronics.

The invention has been illustrated and described in terms of a preferred embodiment as illustrated in FIGS. 1 and 3. As has been previously discussed, reasonable variations and modifications are possible within the scope of the disclosure and the appended claims to the invention.

That which is claimed is:

1. Apparatus for generating a clock signal which has a period equal to the bit period of received non-return to zero (NRZ) digital data and which is synchronized with said received NRZ digital data comprising:

a transition detector means;
means for providing said received NRZ digital data to said transition detector means, wherein said transition detector means provides an output pulse each time said received NRZ digital data makes a state transition;
means for generating a periodic signal;
phase adjusting means;
clock generator means;
means for providing said periodic signal through said phase adjusting means to said clock generator means, wherein said clock generator means generates a clock signal having a period equal to the bit period of said received NRZ digital data in response to said periodic signal;
phase comparator means;
means for providing said clock signal as an input to said phase comparator means;
means for providing the output from said transition detector means to said phase comparator means, wherein said phase comparator means provides an output signal which indicates the degree of synchronization between the output of said transition detector means and said clock signal;
means for providing the output from said phase comparator means to said phase adjusting means, wherein said phase adjusting means subtracts pulses from or adds pulses to said periodic signal so as to adjust the timing of said clock signal in such a manner that said clock signal will be synchronous with the output of said transition detector means;
integrator means;
means for providing said received NRZ digital data to said integrator means; and means for controlling the integration of said received NRZ digital data by said integrator means in response to said clock signal in such a manner that the integration of said received NRZ digital data for each bit period is begun at substantially the beginning of each bit period.

2. Apparatus in accordance with claim 1 wherein said means for providing said received NRZ digital data to said transition detector comprises:

a limiter means; and means for providing said received NRZ digital data through said limiter means to said transition detector means.

3. Apparatus in accordance with claim 1 additionally comprising:

a threshold detector means;

means for providing the output from said integrator means to said threshold detector means, wherein said threshold detector means provides an output signal which is representative of the state of said received NRZ digital data for a particular bit period;

a data latch means; and means for providing the output from said threshold detector means to said data latch means to thereby store the state of said received NRZ digital data for a particular bit period.

4. Apparatus in accordance with claim 2 wherein data is stored in said data latch means in response to said clock signal.

5. A method for establishing a clock signal which has a period equal to the bit period for received non-return to zero (NRZ) digital data and which is synchronized with said received NRZ digital data comprising the steps of:

establishing a transition signal which pulses each time said received NRZ digital data makes a state transition;

generating a periodic signal;

generating said clock signal in response to said periodic signal;

comparing said clock signal to said transition signal to determine if said clock signal is synchronized with said transition signal;

subtracting pulses from or adding pulses to said periodic signal in response to the comparison of said clock signal and said transition signal to thereby shift said clock signal in such a manner that said clock signal will be synchronized with said transition signal, wherein said clock signal is synchronized with said received NRZ digital data when said clock signal is synchronized with said transition signal;

(a) integrating said received NRZ digital data for a bit period;

(b) controlling the integration of said received NRZ digital data in response to said clock signal in such a manner that the integration of said received NRZ digital data begins at the beginning of said bit period; and (c) determining whether the results of said integration of the received NRZ digital data for said bit period is high enough to indicate that said received NRZ digital data is in a first state or low enough to indicate that said received NRZ digital data is in a second state.

6. A method in accordance with claim 5 additionally comprising the steps of:

storing the results of said detection;

destroying the results of said integration; and repeating steps a-c for a new bit period.

* * * * *